(12) United States Patent
Das et al.

(10) Patent No.: US 9,965,581 B1
(45) Date of Patent: May 8, 2018

(54) FANOUT OPTIMIZATION TO FACILITATE TIMING IMPROVEMENT IN CIRCUIT DESIGNS

(71) Applicant: Xilinx, Inc., San Jose, CA (US)

(72) Inventors: Sabyasachi Das, San Jose, CA (US);
Aaron Ng, Santa Clara, CA (US);
Ruibing Lu, Santa Clara, CA (US);
Niyati Shah, San Jose, CA (US);
Zhiyong Wang, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 331 days.

(21) Appl. No.: 14/804,134

(22) Filed: Jul. 20, 2015

(51) Int. Cl.
*G06F 17/50* (2006.01)

(52) U.S. Cl.
CPC ........ *G06F 17/5081* (2013.01); *G06F 17/505* (2013.01); *G06F 17/5077* (2013.01)

(58) Field of Classification Search
CPC . G06F 17/5081; G06F 17/505; G06F 17/5077
USPC ........................................................ 716/103
See application file for complete search history.

(56) References Cited

U.S. PATENT DOCUMENTS

| | | | | |
|---|---|---|---|---|
| 5,396,435 A | * | 3/1995 | Ginetti ................. | G06F 17/505 703/19 |
| 5,963,728 A | * | 10/1999 | Hathaway ........... | G06F 17/5077 716/108 |
| 6,496,965 B1 | * | 12/2002 | van Ginneken ...... | G06F 17/505 716/113 |
| 6,523,156 B2 | * | 2/2003 | Cirit ..................... | G06F 17/505 716/113 |
| 7,111,268 B1 | * | 9/2006 | Anderson ........... | G06F 17/5077 716/113 |

OTHER PUBLICATIONS

Altera, "Quartus II Handbook," QII2007-13.1.0, Nov. 2013, pp. 16-1 to 16-14, vol. 2, Chapter 16, Altera Corp., San Jose, California, USA.
Altera, "Quartus II Handbook," QII2005-13.1.0, Nov. 2013, pp. 12-1 to 12-46, vol. 2, Chapter 12, Altera Corp., San Jose, California, USA.
Chen, Wei et al., "Simultaneous Gate Sizing and Fanout Optimization," Proc. of the 2000 IEEE-ACM International Conference on Computer Aided Design, Nov. 5, 2000, pp. 375-378, IEEE, Piscataway, New Jersey, USA.
Chen, Xun et al., "Timing-Driven Routing of High Fanout Nets," Proc. of the 2001 21st International Conference on Field Programmable Logic and Applications, Sep. 5, 2011, pp. 423-428, IEEE, Piscataway, New Jersey, USA.

(Continued)

*Primary Examiner* — Jack Chiang
*Assistant Examiner* — Brandon Bowers
(74) *Attorney, Agent, or Firm* — Kevin T. Cuenot

(57) ABSTRACT

A method of circuit design may include synthesizing a circuit design using a processor and, for the synthesized circuit design, selectively reducing, using the processor, fanout of nets having a number of loads exceeding a first threshold number of loads and having a selected netlist connectivity. The method may include placing the circuit design using a processor and, for the placed circuit design, selectively reducing, using the processor, fanout of nets according to at least one of a number of loads or criticality.

20 Claims, 5 Drawing Sheets

(56) References Cited

OTHER PUBLICATIONS

Kashfi, Fatemeh, "Multi-Objective Optimization Techniques for VLSI Circuits," Proc. of the 12th International Symposium on Quality Electronic Design, Mar. 14, 2011, pp. 1-8, IEEE, Piscataway, New Jersey, USA.

Kodandapani, K. et al., "A Simple Algorithm for Fanout Optimization using High-Performance Buffer Libraries," Proc. of the 1993 IEEE/ACM International Conference on Computer-Aided Design, Nov. 7, 1993, pp. 466-471, IEEE Computer Society Press, Los Alamitos, California, USA.

Kung, David, "A Fast Fanout Optimization Algorithm for Near-Continuous Buffer Libraries," Proc. of the 35th Annual Design Automation Conference, Jun. 15, 1998, pp. 352-355, ACM, New York, New York, USA.

Rezvani, Peyman et al., "A Fanout Optimization Algorithm Based on the Effort Delay Model," Proc of the International Conference on Computer-Aided Design, Nov. 1999, pp. 516-519, IEEE, Piscataway, New Jersey, USA.

Synopsys, "Synplify Premier" brochure, copyright 2011, pp. 1-4, Synopsys, Inc., Mountain View, California, USA.

\* cited by examiner

FANOUT OPTIMIZATION TO FACILITATE TIMING IMPROVEMENT IN CIRCUIT DESIGNS

TECHNICAL FIELD

This disclosure relates to integrated circuits (ICs) and, more particularly, to performing fanout optimization to facilitate timing improvement in circuit designs for ICs.

BACKGROUND

Implementing a circuit design within an integrated circuit (IC), whether a programmable IC or an application specific IC (ASIC), entails processing the circuit design through a design flow. The design flow includes multiple, different phases. These phases generally include synthesis, placement, and routing.

Synthesis refers to the process of converting, or translating, an abstract, programmatic description of a circuit into a low-level design implementation. The abstract, programmatic description of the circuit describes behavior of the circuit and is also referred to as a "behavioral description" or a "register transfer level (RTL) description" of the circuit. The behavioral description is often specified using a hardware description language (HDL). The low-level design implementation generated through synthesis typically is specified as inter-connected logic gates.

Synthesis may also include mapping. Mapping is the process of correlating, or matching, the logic gates of the low-level circuit design to the various types of circuit blocks or resources that are actually available in the particular IC in which the circuit design is to be implemented, i.e., the "target IC." For example, since a lookup table (LUT) may implement a complex function, one or more logic gates of the low-level design implementation may be mapped to a single LUT, or other programmable tile of the target IC. The mapped circuit design specifies the same functionality as the low-level design implementation, albeit in terms of the particular circuit blocks available on the target IC as opposed to low-level logic gates.

Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned. Routing is the process of selecting particular routing resources such as wires, PIPs, PIP settings, and/or other interconnect circuitry to electrically couple the various circuit blocks of the target IC after placement.

Modern circuit designs often have aggressive timing requirements. Significant time is spent processing the circuit design through the design flow in an attempt to meet these timing requirements. One way of meeting timing requirements, or "closing timing," is to select one or more signal paths of the circuit design and perform timing optimization on the selected signal paths. The particular signal paths to optimize to achieve timing closure, however, are not easily determined. Further complicating matters, optimizing some signal paths, e.g., incorrect signal paths, may lead to a non-convergence condition where the design flow is unable to close timing.

SUMMARY

A method of improving timing for a circuit design may include synthesizing a circuit design using a processor and, for the synthesized circuit design, selectively reducing, using the processor, fanout of nets having a number of loads exceeding a first threshold number of loads and having a selected netlist connectivity. The method may include placing the circuit design using the processor and, for the placed circuit design, selectively reducing, using the processor, fanout of nets according to at least one of a number of loads or criticality.

A system for improving timing of a circuit design includes a processor programmed to initiate executable operations. The executable operations may include synthesizing a circuit design and, for the synthesized circuit design, selectively reducing fanout of nets having a number of loads exceeding a first threshold number of loads and having a selected netlist connectivity. The executable operations may include placing the circuit design and, for the placed circuit design, selectively reducing fanout of nets according to at least one of a number of loads or criticality.

A non-transitory computer-readable medium has instructions stored thereon which, when executed by a processor, perform a method of closing timing for a circuit design as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings should not be construed to be limiting of the inventive arrangements to only the particular implementations shown. Various aspects and advantages will become apparent upon review of the following detailed description and upon reference to the drawings.

DETAILED DESCRIPTION

Figure 1:
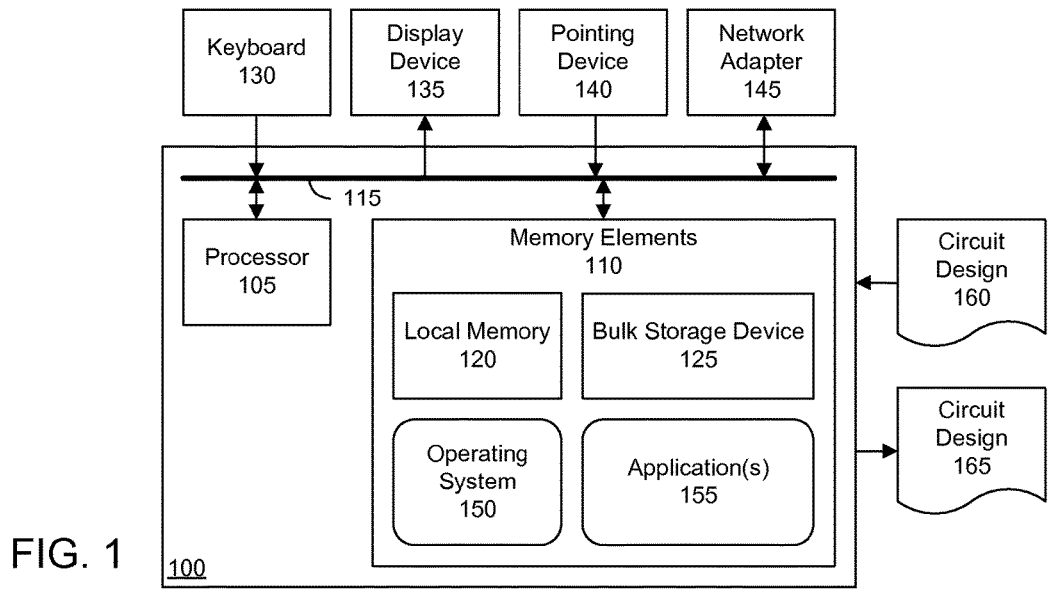
FIG. 1 is a block diagram illustrating an exemplary data processing system.

While the disclosure concludes with claims defining novel features, it is believed that the various features described within this disclosure will be better understood from a consideration of the description in conjunction with the drawings. The process(es) (e.g., methods), machine(s) (e.g., systems), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to performing fanout optimization to facilitate timing improvement in circuit designs for ICs. In accordance with the inventive arrangements described within this disclosure, fanout optimization for a circuit design may be performed at several different locations within a design flow performed on a circuit design. A design flow generally includes one or more phases such as synthesis, placement, and routing. A fanout optimization technique may be performed following at least two of the phases of the design flow. A fanout optimization technique may also be performed after each phase of the design flow. Application of fanout optimization techniques as described facilitates timing closure of the circuit design and/or timing improvement for the circuit design.

As a circuit design progresses through the design flow, the accuracy of the timing models used to evaluate whether the circuit design is meeting timing requirements changes. In general, timing models become increasingly accurate as the design flow progresses. For example, timing models used post-placement tend to be more accurate than timing models used pre-placement. Timing models used post-routing tend to be more accurate than timing models used pre-routing.

Fanout optimization may be applied at different locations in the design flow to take advantage of the evolving timing models that are available. The term "fanout optimization," as used within this disclosure, means a computer-implemented process that attempts to reduce the fanout, i.e., number of loads, of one or more nets in a circuit design. It is often difficult to place the many loads of a high fanout net close to one another so that delays are kept to a minimum. Typically, one or more loads are placed farther away from the source than desired, thereby increasing delay of the high fanout net. Applying fanout optimization may reduce the number of loads on a net, thereby facilitating improved placement and routing for improved timing.

In one aspect, the various fanout optimizations performed may vary according to the particular location within the design flow where applied. By performing fanout optimization following different phases of the design flow as described, the way in which nets are selected for optimization and/or the particular manner in which the nets are optimized may be varied and adapted to changing circumstances throughout the design flow. Performing fanout optimization at different locations in the design flow allows an electronic design automation (EDA) system to account for the changing importance of nets through the different phases of the design flow. The EDA system, for example, may select one or more nets for fanout optimization in one location of the design flow and different nets for fanout optimization at one or more other locations of the design flow.

Conventional solutions often treat timing closure as a point issue where fanout optimization is applied at a single location within the design flow. Conventional solutions also tend to focus on optimizing high fanout nets to the exclusion of other nets. The high fanout nets selected for optimization may later be determined not to be among those considered timing critical. The optimization of nets that do not require optimization may foreclose optimization of other, more critical nets and lead to situations where the EDA system is unable to converge on a solution for the circuit design (e.g., unable to place and/or route the circuit design while meeting timing requirements).

The inventive arrangements described herein may be implemented as a method of improving timing of a circuit design using fanout optimization. The method may be performed by a data processing system. In another aspect, the inventive arrangements may be implemented as an apparatus and/or system configured to improve timing of a circuit design using fanout optimization. The system may be implemented as a data processing system having a processor programmed to perform and/or initiate the executable operations described herein. In still another aspect, the inventive arrangements may be implemented as a non-transitory computer-readable storage medium storing program code that, when executed, causes a processor and/or a system to perform and/or initiate a method of improving timing of a circuit design using fanout optimization.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary data processing system (system) 100. As pictured, system 100 includes at least one processor, e.g., a central processing unit (CPU), 105 coupled to memory elements 110 through a system bus 115 or other suitable circuitry. System 100 stores program code (e.g., computer readable program instructions) within memory elements 110. Processor 105 executes the program code accessed from memory elements 110 via system bus 115. Memory elements 110 include one or more physical memory devices such as, for example, a local memory 120 and one or more bulk storage devices 125. Local memory 120 refers to random access memory (RAM) or other non-persistent memory device(s) generally used during actual execution of the program code. Bulk storage device 125 may be implemented as a hard disk drive (HDD), solid state drive (SSD), or other persistent data storage device. System 100 may also include one or more cache memories (not shown) that provide temporary storage of at least some program code in order to reduce the number of times program code must be retrieved from bulk storage device 125 during execution.

Input/output (I/O) devices such as a keyboard 130, a display device 135, and a pointing device 140 may optionally be coupled to system 100. In some cases, one or more of the I/O devices may be combined as in the case where a touchscreen is used as display device 135. In that case, display device 135 may also implement keyboard 130 and pointing device 140.

The I/O devices may be coupled to system 100 either directly or through intervening I/O controllers. One or more network adapters 145 may also be coupled to system 100 to enable system 100 to become coupled to other systems, computer systems, remote printers, and/or remote storage devices through intervening private or public networks. Modems, cable modems, Ethernet cards, and wireless transceivers and/or radios are examples of different types of network adapter 145 that may be used with system 100. Depending upon the particular implementation of system 100, the specific type of network adapter, or network adapters as the case may be, will vary.

As pictured in FIG. 1, memory elements 110 may store an operating system 150 and one or more applications 155. Application 155, for example, may be an EDA application. In one aspect, operating system 150 and application 155, being implemented in the form of executable program code, are executed by system 100 and, in particular, by processor 105. As such, operating system 150 and application 155 may be considered an integrated part of system 100. Operating system 150, application 155, and any data items used, generated, and/or operated upon by system 100 are functional data structures that impart functionality when utilized by system 100.

In one aspect, system 100 may be a computer or other device that is suitable for storing and/or executing program code. System 100 may represent any of a variety of computer systems and/or devices that include a processor and memory and that are capable of performing the operations described within this disclosure. In some cases, the particular computer system and/or device may include fewer components or more components than described. System 100 may be implemented as a single system as shown or as a plurality of networked or interconnected systems each having an architecture the same as, or similar to, that of system 100.

In operation, system 100 may receive a circuit design 160. Circuit design 160 is a programmatic description of an electronic system. For example, circuit design 160 may be specified as one or more hardware description language (HDL) files, one or more netlist(s), a register transfer level description, or the like. System 100 may perform a design flow on circuit design 160 resulting in circuit design 165. In one aspect, circuit design 165 may be synthesized, placed, and routed by system 100. Further, system 100 may perform a plurality of fanout optimizations on circuit design 160 as part of the design flow. System 100 may perform a fanout optimization after at least two phases of the design flow. For example, system 100 may perform fanout optimization between synthesis and placement and between placement and routing. System 100 may perform fanout optimization between placement and routing and following routing. System 100 may perform fanout optimization between synthesis and placement and after routing. In still another example, system 100 may perform fanout optimization immediately following each of synthesis, placement, and routing.

Figure 2:
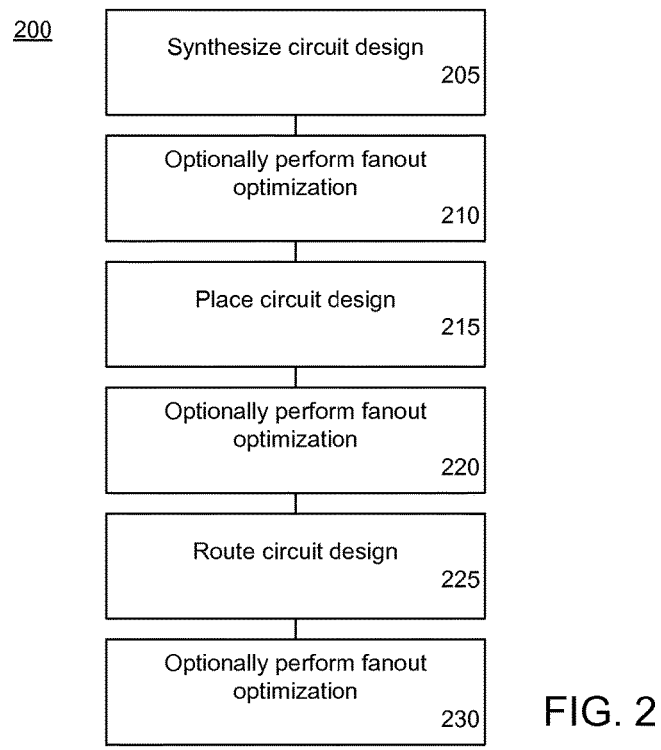
FIG. 2 is a flow chart illustrating an exemplary method of implementing a circuit design within an integrated circuit (IC).

FIG. 2 is a flow chart illustrating an exemplary method 200 of implementing a circuit design within an IC. Method 200 may be performed by a system such as system 100 of FIG. 1. Method 200 illustrates a multiphase design flow where fanout optimization techniques are applied to the circuit design at two or more locations within the design flow.

In block 205, the system may synthesize the circuit design. In block 210, the system optionally performs a fanout optimization on the circuit design. For example, the system may perform a first fanout optimization technique on the synthesized circuit design. The first fanout optimization technique may be one that is specific to a synthesized circuit design that is not yet placed or routed. In one arrangement, the first fanout optimization may be performed to selectively reduce fanout of nets of the synthesized circuit design that have a number of loads exceeding a first threshold number of loads and that have a particular type of connectivity.

In block 215, the system may place the circuit design. Having performed placement, the locations of circuit elements of the circuit design on the target IC are known. As such, the timing models used for timing analysis post-placement may be more accurate than the models used post-synthesis and pre-placement.

In block 220, the system optionally performs a fanout optimization on the placed circuit design. For example, the system may perform a second fanout optimization technique on the placed circuit design. The second fanout optimization technique may be one that is specific to placed circuit designs that are not yet routed. As such, the second fanout optimization technique may be one that is different from the first fanout optimization technique. In one arrangement, the second fanout optimization may be performed to selectively reduce fanout of nets of the placed circuit design according to the number of loads of the net and/or criticality.

In block 225, the system may route the circuit design. Having performed routing, the specific signal path, e.g., wires, in the target IC for the nets of the circuit design are known. As such, the timing models used for timing analysis post-routing may be more accurate than the timing models used at any point in the design flow prior to routing.

In block 230, the system optionally performs a fanout optimization. For example, the system may perform a third fanout optimization technique on the routed circuit design. The third fanout optimization technique may be one that is specific to routed circuit designs. As such, the third fanout optimization technique may be one that is different from the first fanout optimization technique and/or the second fanout optimization technique. In one arrangement, the third fanout optimization may be performed to selectively reduce fanout of nets that are determined to have a worst negative slack.

In one aspect, the fanout optimizations performed in blocks 210, 220, and 230 may be performed with increasing levels of detail or specificity. For example, the fanout optimization performed in block 210 may utilize a broad selection criteria for determining which nets of the circuit design are to be optimized since location information is not yet determined. The fanout optimization performed in block 220 may utilize a more discerning, or narrow, selection criteria than the selection criteria used in block 210 for determining which nets of the circuit design are to be optimized. For example, post placement, location information for sources and loads of nets is available and may be used. The fanout optimization performed in block 230 may utilize an even more discerning, or narrow, selection criteria than that used in block 220 for determining which nets of the circuit design are to be optimized.

The particular fanout optimization that is used in each of blocks 210, 220, and/or 230 may vary. In one aspect, for example, one or more different fanout optimization techniques may be incorporated into method 200 as "plug-in" style processing modules. In this manner, the particular fanout optimization that is implemented, including whether a fanout optimization is implemented at all following a given phase of the design flow, may be updated from time-to-time.

In one aspect, the fanout optimizations of blocks 210 and 220 may be performed while omitting the fanout optimization of block 230. In another example, the fanout optimizations of blocks 210 and 230 may be performed while omitting the fanout optimization of block 220. In still another example, the fanout optimizations of blocks 220 and 230 may be performed while omitting the fanout optimization of block 210. In yet another example, the fanout optimizations of blocks 210, 220, and 230 each may be performed.

Figure 3:
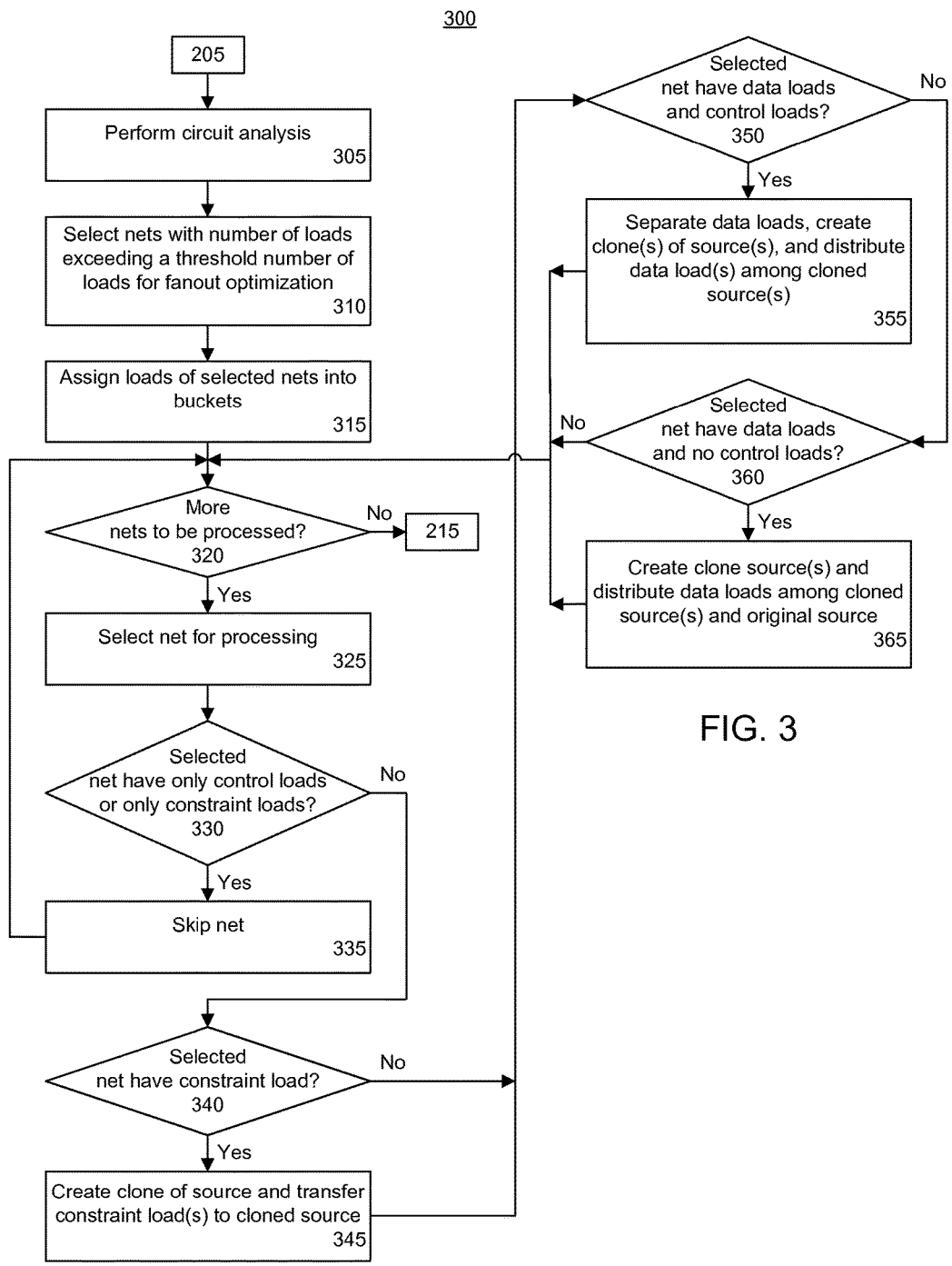
FIG. 3 is a flow chart illustrating an exemplary method of fanout optimization.

FIG. 3 is a flow chart illustrating an exemplary method 300 of fanout optimization. Method 300 may be performed in block 210 of FIG. 2. As discussed, the first phase of the design flow may be synthesis. In general, the first fanout optimization, illustrated in FIG. 3, may selectively process nets according to the number of loads of the net and connectivity of the net. As used herein, the term "connectivity," means the type of loads in a net. A clone of a source of a net may be selectively created according to a load type, i.e., connectivity. Loads of the net may be distributed between the clone of the source and the source.

Continuing from block 205 of FIG. 2, method 300 proceeds to block 305. In block 305, the system may perform circuit analysis on the circuit design. For example, the system may evaluate netlist connectivity, constraints placed on the circuit design including logical and/or physical, and estimated timing of the circuit design. Netlist connectivity refers to identifying which sources (sources) drive which load elements (loads) of the circuit design.

A "logical constraint" refers to a directive that generally indicates how a particular circuit element or group of circuit elements are to be processed during one or more phases of the design flow. An example of a logical constraint is one that requires a particular circuit element, e.g., a look-up table (LUT), to be located in a particular region (e.g., a top-most region) of each logic area of the circuit design. The logical constraint provides direction to the system without specifying an exact location or implementation for the circuit elements covered by the constraint. Another example of a logical constraint may specify that a particular signal should be located at a top-most pin of a circuit block of the target IC without requiring that the signal be located at any one particular instance of the circuit block on the target IC.

A "physical constraint" refers to a directive that specifies an exact placement or implementation for a circuit element of the circuit design. For example, a physical constraint may indicate that a signal is to be located at a top-most pin of a circuit block and also specify the particular circuit block instance on the target IC where the signal is to connect.

In block 310, the system may select nets of the circuit design having a number of loads exceeding a threshold number of loads for fanout optimization. In one aspect, the threshold number of loads may be a number that is specified as a system preference. Further, the threshold number of loads may be specific to the fanout optimization described with reference to FIG. 3.

In block 315, the system may assign loads of the nets selected in block 310 to different buckets. Each bucket represents a particular type of connectivity and, more particular, a particular type of load. In one aspect, the system may use three different buckets. A first bucket may include control loads. A control load is a load in a net that uses a received signal of the net as a control signal. Examples of control signals include clock signals, reset signals, set signals, and the like. A second bucket may include constraint loads. Constraint loads are loads that are covered, e.g., affected by, a physical and/or logical constraint. A third bucket may include data loads. A data load is a load of a net that receives a signal of the net as a data signal. In block 315, the system may determine or categorize the different loads of nets selected in block 310.

In block 320, the system may determine whether any further nets of those selected in block 310 remain to be processed. If so, method 300 may continue to block 325. If not, method 300 may proceed to block 215 of FIG. 2.

Continuing with block 325, the system may select a net from the group of nets selected in block 310. In block 330, the system may determine whether the selected net has only control loads, only constraint loads, or only control and constraint loads. If the system determines that the selected net has only control loads and/or only constraint loads as noted, the system does not modify the net. The system proceeds to block 335, where the net is skipped or omitted from fanout optimization. After block 335, method 300 loops back to block 320 to continue processing.

Continuing with block 340, the system may determine whether the selected net has a constraint load. If so, method 300 continues to block 345. If not, method 300 proceeds to block 350. In block 345, the system may create a clone of the source of the selected net and transfer the constraint loads to the cloned source. Creating a clone may refer to replicating the source, where the replicated source is a "cloned source." Transferring a load may refer to disconnecting the load from a source and coupling the load to a different source such as a cloned source. At this phase of the design flow, the circuit design has been synthesized. Placement and routing have not been performed. Accordingly, the system may insert a clone of the source in the selected net and modify connectivity of the net so that each constraint load is driven by the clone of the source instead of the original source.

In block 350, the system may determine whether the selected net has both data loads and control loads. If so, method 300 proceeds to block 355. If not, method 300 continues to block 360. In block 355, the system may separate the data loads from the control loads of the selected net, create clones of the source(s) of the selected net, and distribute the data loads of the selected net among the cloned sources. After block 355, method 300 may continue to block 320 to continue processing.

In one example, in block 355, the system may calculate the number of cloned sources to create according to the expression "C=D/S" where "C" is an integer number of clones to be created, "D" is an integer specifying the total number of data loads of the selected net, and "S" is a value that may be set by system preference. Having created C cloned sources, the system may distribute the data loads among the cloned source loads. The data loads may be distributed evenly across the cloned sources by transferring the data loads as necessary. The control loads may remain on the original source.

In one aspect, the data loads of the selected net may be sorted based on timing prior to distribution among the cloned sources. The system may distribute the data loads among the cloned sources using a round-robin distribution scheme. As a result, timing critical data loads of the selected net may be evenly distributed among the various cloned sources.

Continuing with block 360, the system may determine whether the selected net has data loads and no control loads. If so, method 300 may continue to block 365. If not, method 300 may proceed to block 320 to continue processing. In block 365, the system may create cloned sources and distribute the data loads across the cloned sources and the original source. After block 365, the system may continue to block 320 to continue processing.

In one example, in block 365, the system may calculate the number of cloned sources to create according to the expression "C=D/S−1", where "C" is an integer number of clones to be created, "D" is an integer specifying the total number of data loads of the selected net, and "S" is a value that may be set by system preference. In this example, D/C data loads are distributed, e.g., left, on the original source and the remainder of the data loads are distributed among the cloned sources. The data loads may be distributed as noted where data loads are distributed among the cloned sources and the original source using a round robin distribution scheme where data loads have previously been sorted according to timing criticality.

Method 300 is presented as one example of a fanout optimization technique that may be implemented. It should be appreciated that any of a variety of different fanout optimization techniques may be performed that are suitable for post-synthesis and pre-placement, pre-routing operation on a circuit design. Accordingly, the inventive arrangements described within this disclosure are not intended to be limited by the particular examples of fanout optimization provided.

Figure 4:
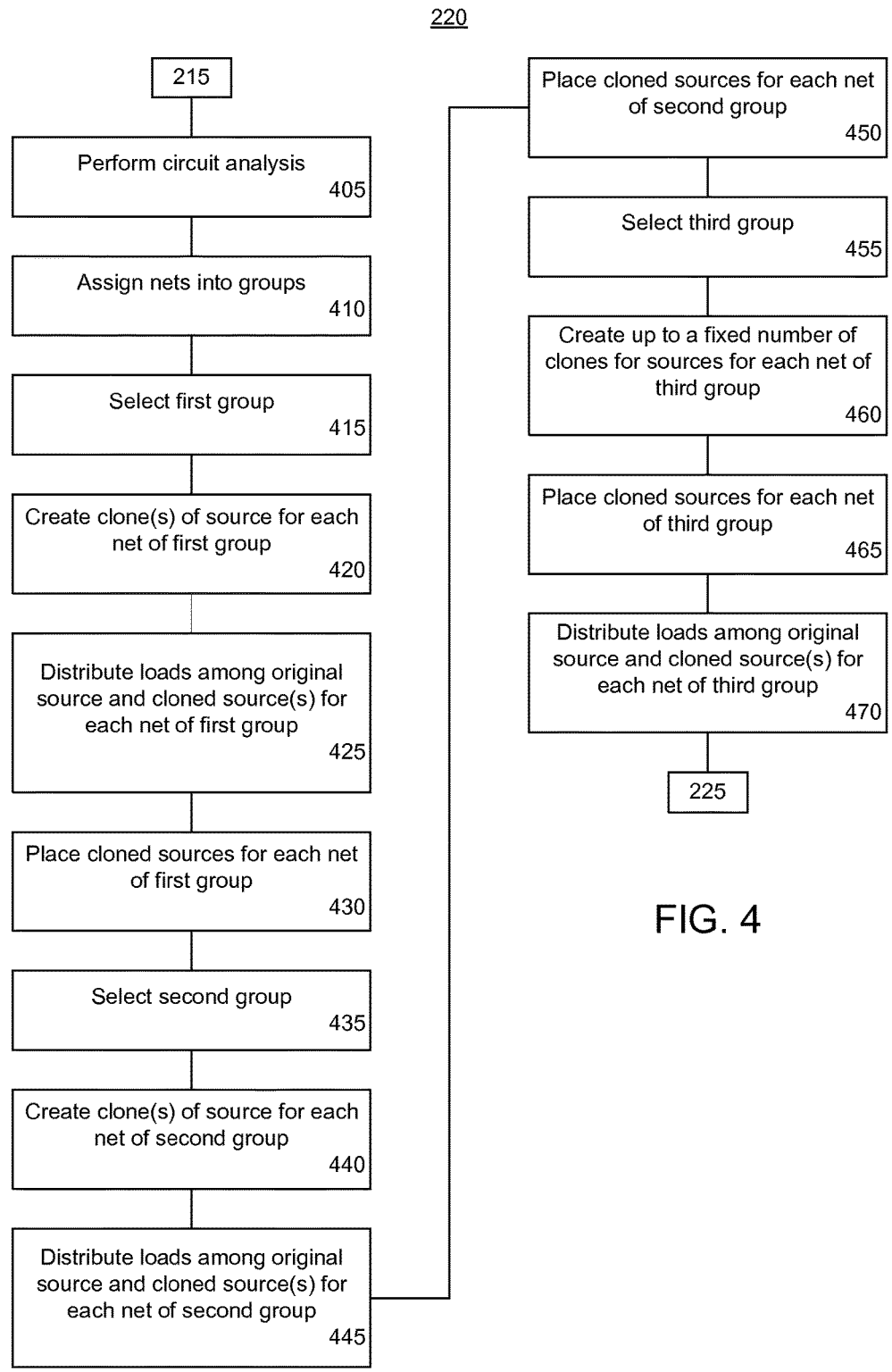
FIG. 4 is a flow chart illustrating another exemplary method of fanout optimization.

FIG. 4 is a flow chart illustrating another exemplary method 400 of fanout optimization. Method 400 may be performed in block 220 of FIG. 2. As discussed, in one exemplary implementation, the second phase of the design flow may be placement. In general, the second fanout optimization technique illustrated in FIG. 4 may selectively process nets of the circuit design according to the number of loads of the net and/or criticality.

For example, the second optimization may process nets by assigning nets of the circuit design having a number of loads in a first range and having a first criticality to a first bucket, assigning nets of the circuit design having a number of loads in a second range and having a second criticality to a second bucket, and assigning nets of the circuit design having a number of loads exceeding the second range to a third bucket. In one aspect, for each net in a bucket, a clone of a source of the net may be created using a bucket specific processing technique. Loads of the net may be distributed among the source and the cloned source using the bucket specific processing technique. The cloned sources may also be placed.

The term "criticality," as used herein in discussing nets, refers to timing of paths of nets. The term "criticality" may refer to the timing of a net being within a predetermined amount or percentage of a reference net or path. The reference net or path may have positive or negative slack, may be a net or path having a longest delay, or may be a path having the most negative slack. In this example, a net having a desired criticality as further defined herein may refer to a path having a positive slack that has a delay within a predetermined amount or percentage of another reference path. In another example, a net having a desired criticality may refer to paths having negative slack as further described herein.

Continuing from block 215 of FIG. 2, method 400 proceeds to block 405. In block 405, the system may perform circuit analysis on the circuit design. For example, the system may evaluate netlist connectivity, constraints placed on the circuit design including logical and/or physical, placement coordinates of circuit elements, and post-placement estimated timing of the circuit design.

In block 410, the system may assign nets into two or more different groups. Nets of the circuit design may be assigned into groups according to the number of loads in each net. In some cases, delay of the net may be used for grouping also.

For example, the system may assign nets that have from 4 to 30 loads and that have a delay within a first range of a net having the longest delay of the circuit design to a first group. The first group is considered to include low fanout nets. The net that has the longest delay of the circuit design may also be referred to as the "worst net." The first range may be specified as any delay that is greater than or equal to a lower bound of (the longest delay–X) and an upper bound of (the longest delay).

In one example, the value of "X" may be expressed as a percentage of the longest delay such as 2% of the longest delay or 0.02*(longest delay). Consider a case where the system determines the longest delay of the circuit design to be 500 ps. The system may select each net that has a number of loads "L" of $4 \leq L \leq 30$ and that has a delay within 2% of the 500 ps longest delay (a delay of at least 490 ps). The ranges used herein as described with reference to the first group and as described below for a second group provide a "guard-band" that allows the system to handle correlation (i.e., inaccuracy) issues that may arise between the placement and the routing phases of the design flow.

The system may assign nets that have between 31 and "Y" loads and a delay within a second range of the worst net to a second group. In one example, the value of Y may be set to 2,000. The upper value number of loads may be any of a variety of different values specified as a preference within the system. It should be appreciated that the upper value number of loads Y may be a number less than 2,000 or a number greater than 2,000 according to preference and the particular type of circuit designs being processed. Nets assigned to the second group may be considered high fanout nets.

The second range may be specified as any delay that is greater than or equal to a lower range of (the longest delay–Z) and an upper range of (the longest delay). In one example, the value of "Z" may be expressed as a percentage of the longest delay such as 5% of the longest delay or 0.05*(longest delay). Consider a case where the system determines the longest delay of the circuit design to be 500 ps. The system may select each net that has a number of loads L of 312,000 and that has a delay within 5% of the 500 ps longest delay (a delay of at least 475 ps).

The system may assign nets that have more than Y, e.g., a threshold of 2,000 in this example, loads to a third group. Nets assigned to the third group may be considered very high fanout nets. In assigning nets to the third group, the system ignores timing estimates since pre-routing timing estimates are subject to significant change once routing is complete. It should be appreciated that thresholds used for evaluating the number of loads of a net and assigning the net to a group may be specific to the example of FIG. 4 and, as such, may be independent of other thresholds for evaluating the number of loads of a net in other examples.

In block 415, the system may select the first group for processing. In block 420, the system may create one or more clones of the sources for the nets in the first group. For example, the system may create one or more cloned sources for each net in the first group. In block 425, the system may distribute loads among the original source and the cloned sources for each net of the first group. In one aspect, the system may use a greedy approach to perform source cloning in block 420 and load balancing in block 425. In block 430, the system may place the cloned sources for the nets of the first group.

In one exemplary implementation using a "greedy approach," loads may be sorted according to timing criticality. The system may create N clones of the source, where N is an integer value. For purposes of illustration, N may be 10. The system may distribute loads among the 10 clones one by one where the most critical load is assigned to the first clone, the second most critical load to the second clone, and so on until the loads are distributed.

Another exemplary implementation of a "greedy approach," may be to use a bounding box. The system may form a bounding box around the locations of the loads for a source. The system may perform recursive bi-partitioning to break, or subdivide, the bounding box into a plurality of regions. The system may then assign one clone of the source to each of the regions, where the cloned source in each region drives the loads located in that region.

In one aspect, the system may process the cloned sources for the nets of the first group collectively, e.g., concurrently, as described with reference to FIG. 4. In another aspect, the system may process nets of the first group on an individual, or per-net basis. In the latter case, the system may process a first net of the first group through source cloning, load distribution, and placement; then process a second net through source cloning, load distribution, and placement; then a third net, etc. In one aspect, the nets of the first group may be sorted according to criticality so that the first net processed is the most critical net of the first group, followed by the second most critical net, etc.

In block 435, the system may select the second group. In block 440, the system may create one or more clones of the sources for the nets in the second group. The system may create one or more cloned sources for each net in the second group. In block 445, the system may distribute loads among the original source and the cloned source(s) for each net of the second group. In one aspect, the system may use a recursive bi-partitioning approach, a conjugate gradient-based (CG-based) approach, or a sliding-window based approach to perform source cloning in block 440 and load distribution in block 445. In block 450, the system may place the cloned sources for the nets of the first group.

In one aspect, the system may process the cloned sources for the nets of the second group collectively, e.g., concurrently, as described with reference to FIG. 4. In another aspect, nets of the second group may be processed on an individual, or per-net basis. For example, a first net of the second group may be processed through source cloning, load distribution, and placement, then a second net processed through source cloning, load distribution, and placement, then a third, etc. In one aspect, the nets of the second group may be sorted according to criticality so that the first net processed is the most critical net of the second group, followed by the second most critical net, etc.

In block 455, the system may select the third group for processing. In block 460, the system may create one or more clones of the sources for the nets in the third group. The system may create one or more cloned sources up to a fixed number of cloned sources that may be set as a system preference for each net in the third group. In one aspect, the number of cloned sources created and inserted into the circuit design may be limited. In one example, the number of clones may be limited to 10 for sources that drive up to 5,000 loads. It should be appreciated, however, that the limit may vary and may be set according to preference. In another exemplary implementation, the system may be restricted to introduce no more than an upper threshold number of total sources, e.g., introduce no more than 30-40 cloned sources.

In block 465, the system may place the cloned sources for the nets of the third group. In block 470, the system may distribute loads among the original source and the cloned source(s) for each net of the second group. The system may distribute loads among the original source and the cloned sources according to the original placement of the loads.

In one exemplary implementation, the system may form a bounding box surrounding the loads of a source. The system may perform recursive bi-partitioning to break the bounding box into a plurality of regions as previously described. The system may then assign one clone of the source to each region, where the cloned source in each region drives the loads located in that region. Loads in one region may be driven by the original source. For example, the region located closest to the original source may be driven by the original source.

In one aspect, the system may process the cloned sources for the nets of the third group collectively, e.g., concurrently, as described with reference to FIG. 4. In another aspect, nets of the third group may be processed on an individual, or per-net basis. For example, a first net of the third group may be processed through source cloning, placement, and load distribution, then a second net processed through source cloning, placement, and load distribution, then a third, etc. In one aspect, the nets of the third group may be sorted according to criticality so that the first net processed is the most critical net of the third group, followed by the second most critical net, etc.

After block 470, method 400 may continue to block 225 of FIG. 2 to continue implementation of the circuit design.

In describing method 400, the first group is processed first, followed by the second group, then the third group. It should be appreciated that the order in which the groups are processed may vary. In another example, the third group may be processed first, followed by the second group, followed by the first group. In another example, the second group may be processed first followed by either the first or third group, then followed by the remaining group, etc.

Method 400 is presented as one example of a fanout optimization technique that may be implemented. It should be appreciated that any of a variety of fanout optimization techniques may be performed that are suitable for post-placement and pre-routing operation on a circuit design. Accordingly, the inventive arrangements described within this disclosure are not intended to be limited by the particular examples of fanout optimization provided.

Figure 5:
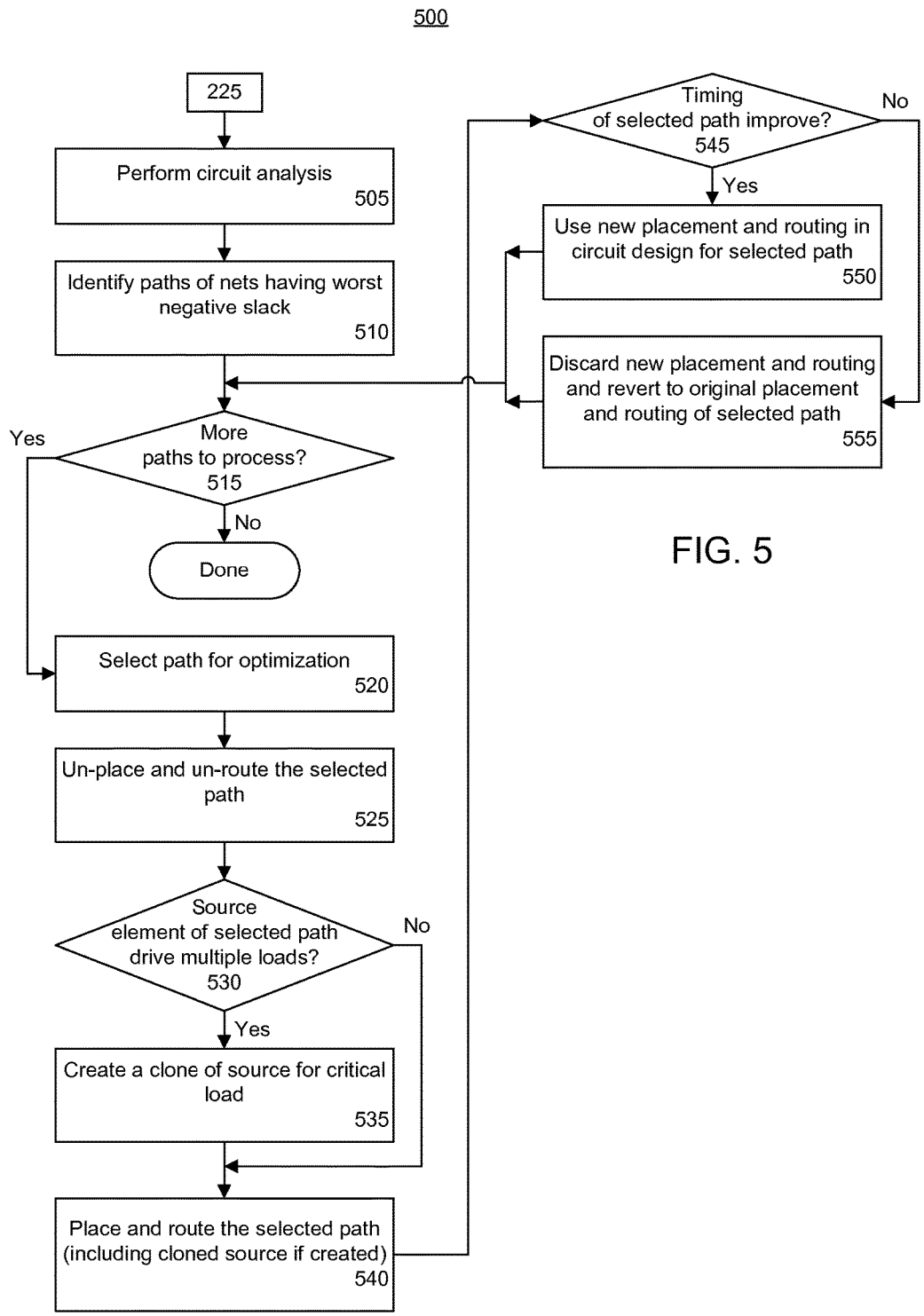
FIG. 5 is a flow chart illustrating another exemplary method of fanout optimization.

FIG. 5 is a flow chart illustrating another exemplary method 500 of fanout optimization. Method 500 may be performed in block 230 of FIG. 2. As discussed, the third phase of the design flow may be routing. In general, the third fanout optimization, illustrated in FIG. 5, may process those nets determined to have a worst negative slack. The third fanout optimization may include un-placing an original placement and un-routing an original routing of a net having an original slack that is negative, re-placing and re-routing the net, comparing a new slack of the re-placed and re-routed net with the original slack, and using the re-placed and re-routed path in the circuit design in place of the original placement and original routing responsive to determining that the new slack improved over the original slack. For example, the re-placed and re-routed path may only be used if timing of the path improves over the original. The third fanout optimization technique is described in greater detail below with reference to FIG. 5.

Continuing from block 225 of FIG. 2, method 500 proceeds to block 505. In block 505, the system may perform circuit analysis on the circuit design. For example, the system may evaluate netlist connectivity, constraints placed on the circuit design including logical and/or physical, placement coordinates, routing wires used to establish connections between circuit elements, and an estimate of timing post-routing. It should be appreciated that post-routing timing estimations are highly accurate since the entire path of signals is fully enumerated with each circuit element, including interconnects, wires, and the like, being known to the system.

In block 510, the system may identify paths of nets that have a worst negative slack. As defined herein, the term "signal path" or "path," as applied in the context of a circuit design, refers to a connection between at least two endpoints. Each endpoint of the path is a synchronous, or clocked, circuit element. One or more combinatorial, or un-clocked, circuit elements may be in the path. A path may be formed by a connection between a source and one or more loads of the source of a net.

As defined within this disclosure, the term "slack" is the difference between a required arrival time of a signal at a load of a net, as defined by a timing requirement, and an estimated arrival time of the signal at the load. A positive slack "s" indicates that the path meets the timing requirement for the path. In that case, the delay of the path may be increased by "s" without increasing the overall delay of the circuit design. A negative slack "s" indicates that the path does not meet the timing requirement for the path. The path is slower than the timing requirement for the path. The estimated arrival time of a signal to the load of the path is after the required arrival time (e.g., the requirement).

In one aspect, the system may determine "N" different paths with the worst, e.g., most negative, slack as the paths with the most negative slack. Correspondingly, the nets including the identified paths may be identified as the nets with the "worst negative slack." In this example, N may be an integer value that may be set as a system preference. The value of N may be set to 0 or more. It should be appreciated that when set to 0, the fanout optimization of FIG. 5 is effectively omitted or skipped.

In block 515, the system may determine whether there are more paths to process from those identified in block 510. If so, method 500 may continue to block 520. If not, method 500 may end.

In block 520, the system may select a path for optimization. In one aspect, the system may select the path having the most negative slack. For example, the system may process paths from most negative to least negative thereby processing the most critical paths first.

In block 525, the system may un-place and un-route the selected path. In general, the process of un-placing and un-routing a path, or a net, may be referred to as "ripping up" the path or net as the case may be. In effect, the placement and routing information for the path may be disassociated from the path, e.g., removed from the circuit design for the source and load elements, and stored for subsequent deletion or reincorporation into the circuit design.

In block 530, the system may determine whether the source of the path drives multiple loads. If so, method 500 continues to block 535. If not, method 500 proceeds to block 540. In block 535, the system may create a clone of the source for the critical load. The critical load is the load of the path or net that is critical or that is most critical.

In block 540, the system may place and route the selected path. In placing and routing the selected path, the system may also place and route the cloned source, if created in block 535. In block 545, the system may determine whether the timing of the newly placed and routed path has improved. For example, the system may compare the timing, e.g., the slack, of the newly placed and routed path with the timing, e.g., slack, of the selected path prior to being ripped up in block 525. If the criticality of the path is reduced as a consequence of block 540, method 500 may continue to block 550. If not, method 500 may proceed to block 555.

In block 550, the system may use the new placement and routing for the selected path in the circuit design. More particularly, the new placement and routing for the selected path may be stored as part of the circuit design in place of the original placement and routing that was ripped-up in block 525. The original placement and routing may be deleted. After block 550, method 500 may continue to block 515 to continue processing.

In block 555, the system may discard the new placement and routing for the selected path and revert to the original placement and routing for the selected path. The system, for example, may rip-up the new placement and routing for the selected path determined in block 540 and restore the original placement and routing for the selected path within the circuit design. The original placement and routing is maintained for the selected path within the circuit design.

Method 500 is presented as one example of a fanout optimization technique that may be implemented. It should be appreciated that any of a variety of fanout optimization techniques may be performed that are suitable for post-routing operation on a circuit design. Accordingly, the inventive arrangements described within this disclosure are not intended to be limited by the particular examples of fanout optimization provided.

Figure 6:
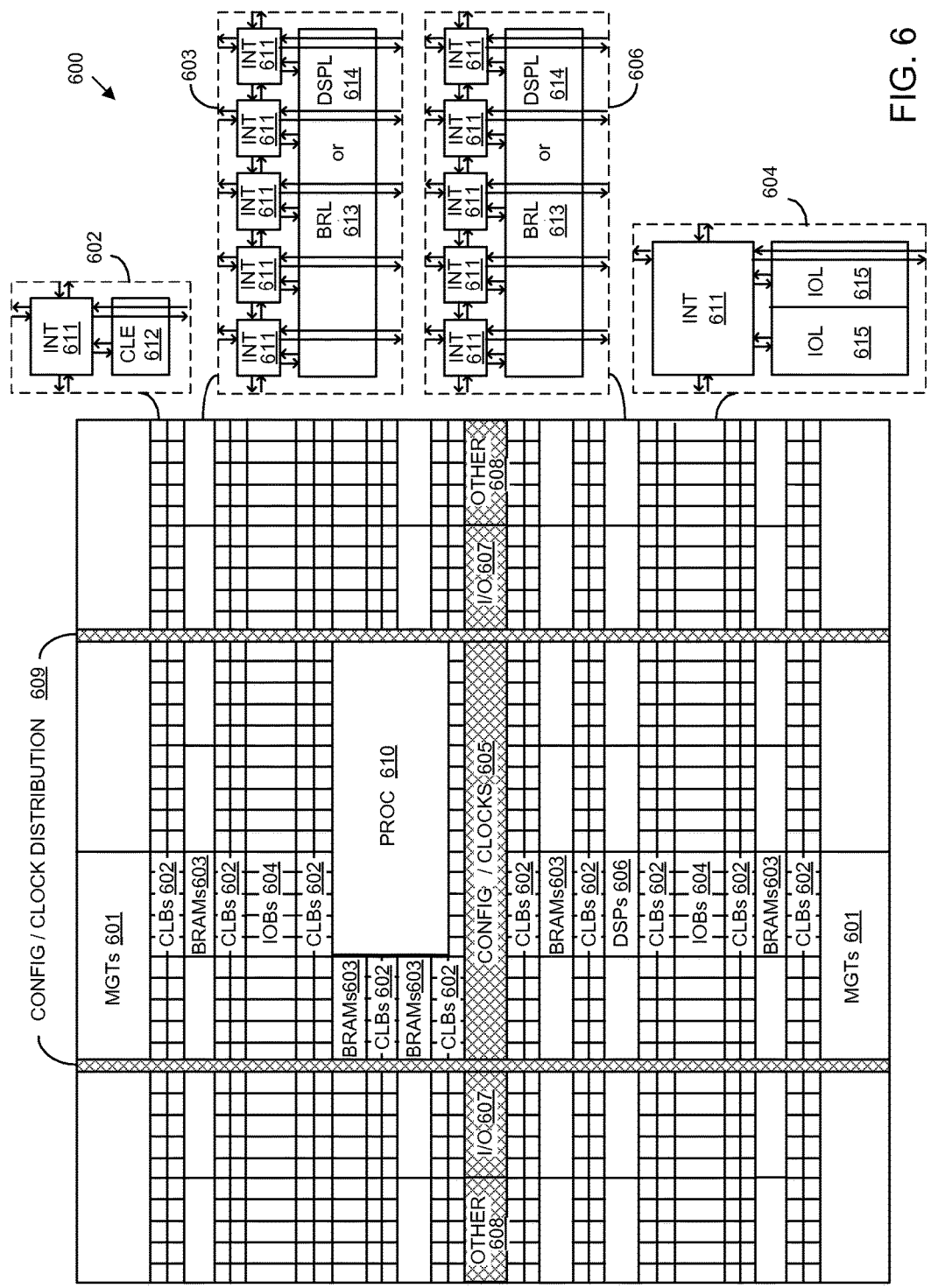
FIG. 6 is a block diagram illustrating an exemplary architecture for an IC.

FIG. 6 is a block diagram illustrating an exemplary architecture 600 for an IC. In one aspect, architecture 600 may be implemented within a programmable IC. For example, architecture 600 may be used to implement a field programmable gate array (FPGA). Architecture 600 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 600 includes several different types of programmable circuit, e.g., logic, blocks. For example, architecture 600 may include a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized I/O blocks 607 (e.g., configuration ports and clock ports), and other programmable logic 608 such as digital clock managers, analog-to-digital converters, system monitoring logic, and so forth.

In some ICs, each programmable tile includes a programmable interconnect element (INT) 611 having standardized connections to and from a corresponding INT 611 in each adjacent tile. Therefore, INTs 611, taken together, implement the programmable interconnect structure for the illustrated IC. Each INT 611 also includes the connections to and from the programmable logic element within the same tile, as shown by the examples included at the top of FIG. 6.

For example, a CLB 602 may include a configurable logic element (CLE) 612 that may be programmed to implement user logic plus a single INT 611. A BRAM 603 may include a BRAM logic element (BRL) 613 in addition to one or more INTs 611. Typically, the number of INTs 611 included in a tile depends on the height of the tile. As pictured, a BRAM tile has the same height as five CLBs, but other numbers (e.g., four) also may be used. A DSP tile 606 may include a DSP logic element (DSPL) 614 in addition to an appropriate number of INTs 611. An 10B 604 may include, for example, two instances of an I/O logic element (IOL) 615 in addition to one instance of an INT 611. The actual I/O pads connected to IOL 615 may not be confined to the area of IOL 615.

In the example pictured in FIG. 6, a columnar area near the center of the die, e.g., formed of regions 605, 607, and 608, may be used for configuration, clock, and other control logic. Horizontal areas 609 extending from this column may be used to distribute the clocks and configuration signals across the breadth of the programmable IC.

Some ICs utilizing the architecture illustrated in FIG. 6 include additional logic blocks that disrupt the regular columnar structure making up a large part of the IC. The additional logic blocks may be programmable blocks and/or dedicated circuitry. For example, a processor block depicted as PROC 610 spans several columns of CLBs and BRAMs.

In one aspect, PROC 610 may be implemented as dedicated circuitry, e.g., as a hardwired processor, that is fabricated as part of the die that implements the programmable circuitry of the IC. PROC 610 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 610 may be omitted from architecture 600 and replaced with one or more of the other varieties of the programmable blocks described. Further, such blocks may be utilized to form a "soft processor" in that the various blocks of programmable circuitry may be used to form a processor that can execute program code as is the case with PROC 610.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 6 that are external to PROC 610 such as CLBs 602 and BRAMs 603 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 610.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 610 or a soft processor. In some cases, architecture 600 includes a dedicated configuration processor that loads the configuration bitstream to the appropriate configuration memory and/or processor memory. The dedicated configuration processor does not execute user-specified program code. In other cases, architecture 600 may utilize PROC 610 to receive the configuration bitstream, load the configuration bitstream into appropriate configuration memory, and/or extract program code for execution.

FIG. 6 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 6 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 610 within the IC are for purposes of illustration only and are not intended as limitations.

In one aspect, a circuit design may be processed as described herein for implementation within a target IC that uses architecture 600 or an architecture similar to architecture 600. It should be appreciated that the inventive arrangements described within this disclosure may also be used for circuit designs that may be implemented as ASICs.

The various techniques described herein may be implemented in a fully automated manner to achieve timing closure and/or to improve timing. In applying the techniques described herein to a library of varied circuit designs, operating frequency (e.g., speed) of the circuit designs was observed to increase by approximately 2% in some cases, while improvements of approximately 15% were observed in other cases.

The inventive arrangements described within this disclosure facilitate the identification of fanout critical portions of a circuit design at different locations within a design flow. The techniques described herein are dynamic in that the different fanout optimizations automatically adjust and/or account for timing inaccuracy found between different stages of the design flow. Further, the techniques described herein may efficiently handle larger numbers of clock groups (e.g., clock domains). For example, circuit designs with approximately 30 to 40 clock groups may be processed using the inventive arrangements described herein.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

In some instances, the term "signal" may be used within this disclosure to describe physical structures such as terminals, pins, signal lines, wires. In other instances, the term "signal" may be used to refer to particular values specified by a wire depending upon the context. The term "signal" may refer to the conveyance of a single bit, e.g., a single wire, or the conveyance of multiple parallel bits through multiple parallel wires. Further, each signal may represent bi-directional communication between two, or more, components connected by the signal.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of improving timing of a circuit design may include synthesizing a circuit design using a processor and, for the synthesized circuit design, selectively reducing, using the processor, fanout of nets having a number of loads exceeding a first threshold number of loads and having a selected netlist connectivity. The method may include placing the circuit design using the processor and, for the placed circuit design, selectively reducing, using the processor, fanout of nets according to at least one of a number of loads or criticality.

The method may also include routing the circuit design using the processor and, for the routed circuit design, selectively reducing, using the processor, fanout of a net having worst negative slack.

For the synthesized circuit design, reducing fanout may include selectively creating a clone of a source of a net according to load type and distributing loads of the net between the clone of the source and the source.

For the synthesized circuit design, reducing fanout may include skipping nets having at least the threshold number of loads where each load of the net is either a control load or a constraint load.

For the synthesized circuit design, reducing fanout may include, responsive to determining that a net includes a plurality of different load types including a constraint load, creating a clone of a source of the net and transferring the constraint load to the clone of the source.

For the synthesized circuit design, reducing fanout may also include, responsive to determining that a net includes data loads and a control load, creating at least one clone of a source of the net and distributing the data loads among the at least one clone of the source.

For the synthesized circuit design, reducing fanout further may include, responsive to determining that a net includes data loads and no control loads, creating at least one clone of a source of the net and distributing the data loads among the at least one clone of the source and the source.

For the placed circuit design, reducing fanout may include assigning nets to a first group and a second group according to number of loads and criticality, assigning nets having a number of loads exceeding a second threshold to a third group, and, for each net in a group, creating a clone of a source of the net, distributing loads of the net among the source and the cloned source, and placing the cloned sources.

In another arrangement, for the placed circuit design, reducing fanout may include assigning nets of the circuit design having a number of loads in a first range and having a first criticality to a first group, assigning nets of the circuit design having a number of loads in a second range and having a second criticality to a second group, and assigning nets of the circuit design having a number of loads exceeding the second range to a third group. For each net in a group, reducing fanout may include creating a clone of a source of the net using a group specific processing technique, distributing loads of the net among the source and the cloned source using the group specific processing technique, and placing the cloned sources.

For the routed circuit design, reducing fanout may include un-placing an original placement and un-routing an original routing of a path having an original slack that is negative, placing and routing the path, comparing a new slack of the re-placed and re-routed path with the original slack, and using the re-placed and re-routed path in the circuit design in place of the original placement and original routing responsive to determining that the new slack improved over the original slack.

A system for improving timing of a circuit design may include a processor programmed to initiate executable operations. The executable operations may include synthesizing a circuit design and, for the synthesized circuit design, selectively reducing fanout of nets having a number of loads exceeding a first threshold number of loads and having a selected netlist connectivity. The executable operations may include placing the circuit design and, for the placed circuit design, selectively reducing fanout of nets according to at least one of a number of loads or criticality.

The processor may be further programmed to initiate executable operations including routing the circuit design and, for the routed circuit design, selectively reducing fanout of a net having worst negative slack.

For the synthesized circuit design, reducing fanout may include selectively creating a clone of a source of a net according to load type and distributing loads of the net between the clone of the source and the source.

For the synthesized circuit design, reducing fanout may include skipping nets having at least the threshold number of loads where each load of the net is either a control load or a constraint load.

For the synthesized circuit design, reducing fanout may include, responsive to determining that a net includes a plurality of different load types including a constraint load, creating a clone of a source of the net and transferring the constraint load to the clone of the source.

For the synthesized circuit design, reducing fanout may also include, responsive to determining that a net includes data loads and a control load, creating at least one clone of a source of the net and distributing the data loads among the at least one clone of the source.

For the synthesized circuit design, reducing fanout may further include, responsive to determining that a net includes data loads and no control loads, creating at least one clone of a source of the net and distributing the data loads among the at least one clone of the source and the source.

For the placed circuit design, reducing fanout may include assigning nets to a first group and a second group according to number of loads and criticality, assigning nets having a number of loads exceeding a second threshold to a third group, and for each net in a group, creating a clone of a source of the net, distributing loads of the net among the source and the cloned source, and placing the cloned sources.

In another arrangement, for the placed circuit design, reducing fanout may include assigning nets of the circuit design having a number of loads in a first range and having a first criticality to a first group, assigning nets of the circuit design having a number of loads in a second range and having a second criticality to a second group, and assigning nets of the circuit design having a number of loads exceeding the second range to a third group. For each net in the group, reducing fanout may include, creating a clone of a source of the net using a group specific processing technique, distributing loads of the net among the source and the cloned source using the group specific processing technique, and placing the cloned sources.

For the routed circuit design, reducing fanout may include un-placing an original placement and un-routing an original routing of a path having an original slack that is negative, placing and routing the path, comparing a new slack of the re-placed and re-routed path with the original slack, and using the re-placed and re-routed path in the circuit design in place of the original placement and original routing responsive to determining that the new slack improved over the original slack.

A non-transitory computer-readable storage medium having instructions stored thereon which, when executed by a processor, perform one or more methods as described within this disclosure.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of improving timing of a circuit design, comprising:
    synthesizing a circuit design using a processor;
    for the synthesized circuit design, selectively reducing, using the processor, fanout of nets comprising a number of loads exceeding a first threshold number of loads by grouping loads of the nets as data loads, control loads, or constraint loads and performing a fanout reduction technique on the nets selected based upon the grouping of the loads of the nets;
    placing the circuit design using the processor; and
    for the placed circuit design, selectively reducing, using the processor, fanout of nets according to at least one of a number of loads or criticality;
    wherein the circuit design is configured for implementation within an integrated circuit.

2. The method of claim 1, further comprising:
    routing the circuit design using the processor; and
    for the routed circuit design, selectively reducing, using the processor, fanout of a net having a worst negative slack.

3. The method of claim 1, wherein, for the synthesized circuit design, reducing fanout comprises:
    selectively creating a clone of a source of a net according to load type; and
    distributing loads of the net between the clone of the source and the source.

4. The method of claim 1, wherein, for the synthesized circuit design, reducing fanout comprises:
    skipping nets comprising at least the threshold number of loads where each load of the net is either a control load or a constraint load.

5. The method of claim 1, wherein, for the synthesized circuit design, reducing fanout comprises:
    responsive to determining that a net comprises a plurality of different load types including a constraint load, creating a clone of a source of the net and transferring the constraint load to the clone of the source.

6. The method of claim 1, wherein, for the synthesized circuit design, reducing fanout comprises:
    responsive to determining that a net includes data loads and a control load, creating at least one clone of a source of the net and distributing the data loads among the at least one clone of the source.

7. The method of claim 1, wherein, for the synthesized circuit design, reducing fanout comprises:
    responsive to determining that a net comprises data loads and no control loads, creating at least one clone of a source of the net and distributing the data loads among the at least one clone of the source and the source.

8. The method of claim 1, wherein, for the placed circuit design, reducing fanout comprises:
assigning nets to a first group and a second group according to number of loads and criticality;
assigning nets comprising a number of loads exceeding a second threshold to a third group; and
for each net in a group, creating a clone of a source of the net, distributing loads of the net among the source and the cloned source, and placing the cloned sources.

9. The method of claim 1, wherein, for the placed circuit design, reducing fanout comprises:
assigning nets of the circuit design comprising a number of loads in a first range and comprising a first criticality to a first group;
assigning nets of the circuit design comprising a number of loads in a second range and comprising a second criticality to a second group;
assigning nets of the circuit design comprising a number of loads exceeding the second range to a third group; and
for each net in a group, creating a clone of a source of the net using a group specific processing technique, distributing loads of the net among the source and the cloned source using the group specific processing technique, and placing the cloned sources.

10. The method of claim 2, wherein, for the routed circuit design, reducing fanout comprises:
un-placing an original placement and un-routing an original routing of a path having an original slack that is negative;
placing and routing the path;
comparing a new slack of the re-placed and re-routed path with the original slack; and
using the re-placed and re-routed path in the circuit design in place of the original placement and original routing responsive to determining that the new slack improved over the original slack.

11. A system for improving timing of a circuit design, comprising:
a processor programmed to initiate executable operations comprising:
synthesizing a circuit design;
for the synthesized circuit design, selectively reducing fanout of nets comprising a number of loads exceeding a first threshold number of loads by grouping loads of the nets as data loads, control loads, or constraint loads and performing a fanout reduction technique on the nets selected based upon the grouping of the loads of the nets;
placing the circuit design; and
for the placed circuit design, selectively reducing fanout of nets according to at least one of a number of loads or criticality;
wherein the circuit design is configured for implementation within an integrated circuit.

12. The system of claim 11, wherein the processor is further programmed to initiate executable operations comprising:
routing the circuit design; and
for the routed circuit design, selectively reducing fanout of a net having a worst negative slack.

13. The system of claim 11, wherein, for the synthesized circuit design, reducing fanout comprises:
selectively creating a clone of a source of a net according to load type; and
distributing loads of the net between the clone of the source and the source.

14. The system of claim 11, wherein, for the synthesized circuit design, reducing fanout comprises:
skipping nets comprising at least the threshold number of loads where each load of the net is either a control load or a constraint load.

15. The system of claim 11, wherein, for the synthesized circuit design, reducing fanout comprises:
responsive to determining that a net comprises a plurality of different load types including a constraint load, creating a clone of a source of the net and transferring the constraint load to the clone of the source.

16. The system of claim 11, wherein, for the synthesized circuit design, reducing fanout comprises:
responsive to determining that a net includes data loads and a control load, creating at least one clone of a source of the net and distributing the data loads among the at least one clone of the source.

17. The system of claim 11, wherein, for the synthesized circuit design, reducing fanout comprises:
responsive to determining that a net comprises data loads and no control loads, creating at least one clone of a source of the net and distributing the data loads among the at least one clone of the source and the source.

18. The system of claim 11, wherein, for the placed circuit design, reducing fanout comprises:
assigning nets to a first group and a second group according to number of loads and criticality;
assigning nets comprising a number of loads exceeding a second threshold to a third group; and
for each net in a group, creating a clone of a source of the net, distributing loads of the net among the source and the cloned source, and placing the cloned sources.

19. The system of claim 11, wherein, for the placed circuit design, reducing fanout comprises:
assigning nets of the circuit design comprising a number of loads in a first range and comprising a first criticality to a first group;
assigning nets of the circuit design comprising a number of loads in a second range and comprising a second criticality to a second group;
assigning nets of the circuit design comprising a number of loads exceeding the second range to a third group; and
for each net in a group, creating a clone of a source of the net using a group specific processing technique, distributing loads of the net among the source and the cloned source using the group specific processing technique, and placing the cloned sources.

20. The system of claim 12, wherein, for the routed circuit design, reducing fanout comprises:
un-placing an original placement and un-routing an original routing of a path having an original slack that is negative;
placing and routing the path;
comparing a new slack of the re-placed and re-routed path with the original slack; and
using the re-placed and re-routed path in the circuit design in place of the original placement and original routing responsive to determining that the new slack improved over the original slack.

* * * * *